United States Patent
Modha et al.

(10) Patent No.: US 6,875,391 B2
(45) Date of Patent: Apr. 5, 2005

(54) METHOD OF MAKING A GLOVE HAVING IMPROVED DONNING CHARACTERISTICS

(75) Inventors: Shantilal Hirji Modha, Alpharetta, GA (US); Mary Elizabeth Kister, Cumming, GA (US); Loi Vinh Huynh, Roswell, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 319 days.

(21) Appl. No.: 10/161,512

(22) Filed: Jun. 3, 2002

(65) Prior Publication Data

US 2003/0221239 A1 Dec. 4, 2003

(51) Int. Cl.[7] .................. B29C 41/08; B29C 41/14; B29C 41/20
(52) U.S. Cl. .................. 264/307; 264/308; 264/309
(58) Field of Search .................. 264/255, 256, 264/299, 301, 307, 308, 309; 2/161.7, 168; 428/36.8, 36.91, 521, 522

(56) References Cited

U.S. PATENT DOCUMENTS

| | | |
|---|---|---|
| 3,411,982 A | 11/1968 | Kavalir et al. |
| 3,740,262 A | 6/1973 | Agostinelli |
| 3,992,221 A | 11/1976 | Homsy et al. |

(Continued)

FOREIGN PATENT DOCUMENTS

| | | |
|---|---|---|
| EP | 0 455 323 A2 | 11/1991 |
| EP | 0 356 580 B1 | 6/1995 |
| EP | 0 609 387 B1 | 4/1999 |
| EP | 0 931 633 A2 | 7/1999 |
| EP | 1 036 810 A2 | 9/2000 |
| EP | 0 714 961 B1 | 4/2001 |
| WO | 00/09320 | 2/2000 |
| WO | 00/47070 | 8/2000 |
| WO | 01/78620 A1 | 10/2001 |
| WO | 02/02321 A1 | 1/2002 |

OTHER PUBLICATIONS

JP 61024418 A (Abstract—Japan); Feb. 3, 1986; Patent Assignee: St Kagaku Kogyo KK.

JP 2000096320 A (Abstract—Japan) ; Apr. 4, 2000; Patent Assignee: Shoowa KK.

Primary Examiner—Angela Ortiz
(74) Attorney, Agent, or Firm—Dana E. Stano; Vincent T. Kung

(57) ABSTRACT

A textured elastomeric article and a method of making such an article is disclosed. The article includes a substrate body having an inside surface and a plurality of alkaline earth salt particles embedded within at least a portion of the inside surface but not extending through the thickness of the article such that no separate binder material is needed to affix the particles.

32 Claims, 2 Drawing Sheets

U.S. PATENT DOCUMENTS

| | | |
|---|---|---|
| 4,143,109 A | 3/1979 | Stockum |
| 4,304,008 A | 12/1981 | Joung |
| 4,548,844 A | 10/1985 | Podell et al. |
| 4,575,476 A | 3/1986 | Podell et al. |
| 4,597,108 A | 7/1986 | Momose |
| 4,851,266 A | 7/1989 | Momose et al. |
| 5,069,965 A | 12/1991 | Esemplare |
| 5,088,125 A | 2/1992 | Ansell et al. |
| 5,272,771 A | 12/1993 | Ansell et al. |
| 5,395,666 A | 3/1995 | Brindle |
| 5,399,400 A | 3/1995 | Nile et al. |
| 5,405,666 A | 4/1995 | Brindle |
| 5,545,451 A | 8/1996 | Haung et al. |
| 5,549,924 A | 8/1996 | Shlenker et al. |
| 5,570,475 A | 11/1996 | Nile et al. |
| 5,601,870 A | 2/1997 | Haung et al. |
| 5,612,083 A | 3/1997 | Haung et al. |
| 5,742,943 A | 4/1998 | Chen |
| 5,792,531 A * | 8/1998 | Littleton et al. ............ 428/36.8 |
| 5,977,223 A * | 11/1999 | Ryan et al. ................. 524/221 |
| 5,993,923 A | 11/1999 | Lee |
| 6,075,081 A | 6/2000 | Nile et al. |
| 6,194,508 B1 * | 2/2001 | Achenbach et al. ........ 524/492 |
| 6,306,514 B1 | 10/2001 | Weikel et al. |
| 6,345,394 B1 | 2/2002 | Nakamura et al. |
| 6,347,409 B1 | 2/2002 | Nile et al. |
| 6,649,116 B2 * | 11/2003 | Stephenson et al. ........ 264/439 |
| 6,673,871 B2 * | 1/2004 | Warneke et al. ......... 525/331.7 |
| 6,730,380 B2 * | 5/2004 | Littleton et al. ............ 428/36.8 |

* cited by examiner

METHOD OF MAKING A GLOVE HAVING IMPROVED DONNING CHARACTERISTICS

BACKGROUND OF THE INVENTION

Tightly fitting elastomeric articles, such as surgical and examination gloves, may be difficult to don due to blocking, the tendency of the glove elastomer to stick to itself. As a result, gloves often contain a powdered lubricant on the surface that contacts the skin of the wearer to facilitate donning. Most commonly, epichlorohydrin treated crosslinked cornstarch is dusted on the inner surface of the glove during manufacturing.

While use of cornstarch does improve the donning characteristics of the glove, it may not be feasible for all applications. One such situation is the use of powders for surgical glove applications. If some of the powder inadvertently enters the surgical site, it may cause complications for the patient. For instance, the powder may carry an infectious agent or the patient may be allergic to the powder.

Other techniques may be used to improve the donning characteristics of surgical and examination gloves. These techniques include, for example, manufacturing the glove from a modified latex, using an inner layer of a hydrophilic polymer, applying a slip coating to the inner surface of the glove, providing lubricating particles on the inner surface of the glove, and the like. However, as some degree of blocking may still occur with these techniques, there remains a need for a glove with improved donning characteristics.

SUMMARY OF THE INVENTION

The present invention contemplates a method of making a textured article having improved donning characteristics including providing a substrate body, and applying to the substrate body a donning layer composition comprising a polymer and a plurality of alkaline earth salt particles. A lubricant composition may also be applied to the substrate body.

The present invention also contemplates a method of making an article having improved donning characteristics including providing a substrate body formed on a former, applying to the substrate body into a donning layer composition comprising 1,2-syndiotactic polybutadiene, a plurality of alkaline earth salt particles, and natural rubber, thereby forming a donning layer, curing the substrate body and donning layer to form an article, removing the article from the former, and inverting the article. The composition may be applied using a dipping process, a spraying process, or the like.

The present invention further contemplates a method of making a glove having improved donning characteristics including providing a substrate body comprising natural rubber formed on a hand-shaped former, dipping the substrate body into a donning layer composition comprising 1,2-syndiotactic polybutadiene, a plurality of alkaline earth salt particles, and natural rubber, thereby forming a donning layer, curing the substrate body and donning layer to form a glove, removing the glove from the former, and inverting the glove.

The present invention further contemplates a method of making a glove having improved donning characteristics including providing a substrate body comprising natural rubber formed on a hand-shaped former, dipping the substrate body into a donning layer composition comprising from about 2 mass % to about 5 mass % 1,2-polybutadiene, about 0.5 mass % to about 3 mass % alkaline earth salt particles, and about 1 mass % to about 3 mass % natural rubber, thereby forming a donning layer, curing the substrate body and donning layer to form a glove, removing the glove from the former, and inverting the glove.

The present invention further contemplates a method of making a glove having improved donning characteristics including providing a substrate body comprising natural rubber formed on a hand-shaped former, dipping the substrate body into a donning layer composition comprising about 5 mass % 1,2-syndiotactic polybutadiene, about 2 mass % magnesium carbonate, about 3 mass % natural rubber, and about 90 mass % water, thereby forming a donning layer, curing the substrate body and donning layer to form a glove, removing the glove from the former, and inverting the glove.

The present invention further contemplates a method of making a textured article including providing a substrate body formed on a former, spraying the substrate body with a donning layer composition comprising an elastomeric polymer and a plurality of alkaline earth particles to form a donning layer, and removing the article from the former.

The present invention finally contemplates a composition for use in forming a glove including from about 2 mass % to about 5 mass % 1,2-syndiotactic polybutadiene, about 0.5% to about 3 mass % alkaline earth salt particles, about 1 mass % to about 3 mass % natural rubber, and about 89 mass % to about 96.5 mass % water.

DESCRIPTION OF THE INVENTION

Figure 1:
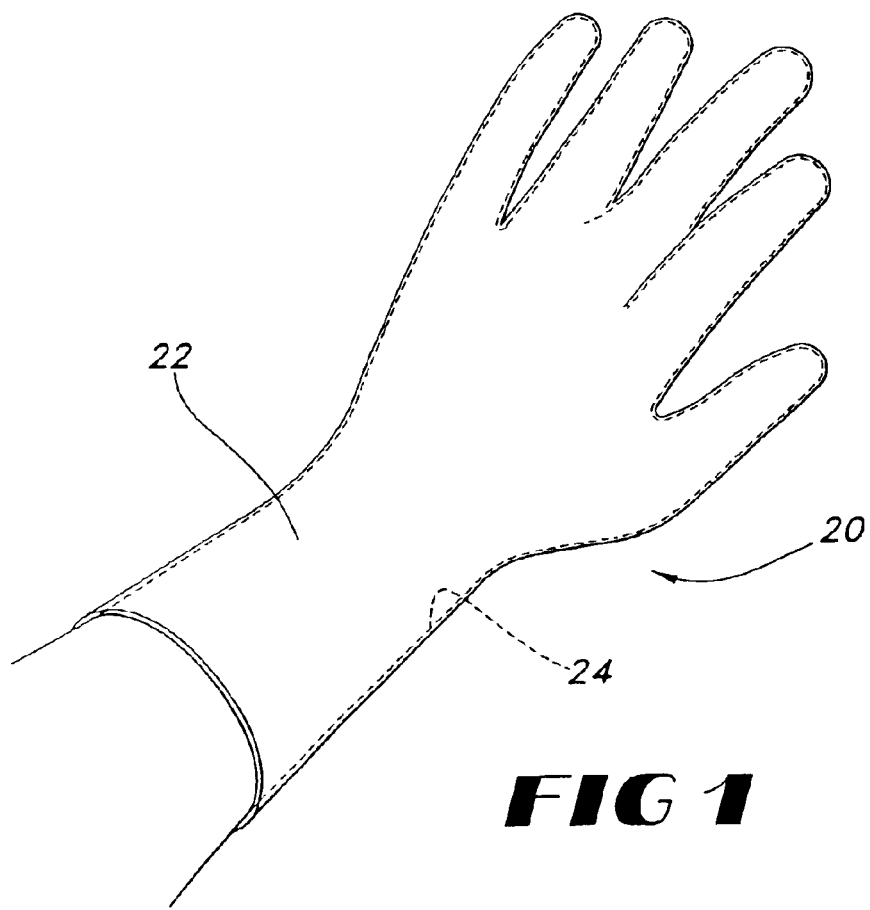
FIG. 1 is a perspective view of an elastomeric article, namely a glove, according to the present invention.
Figure 2:
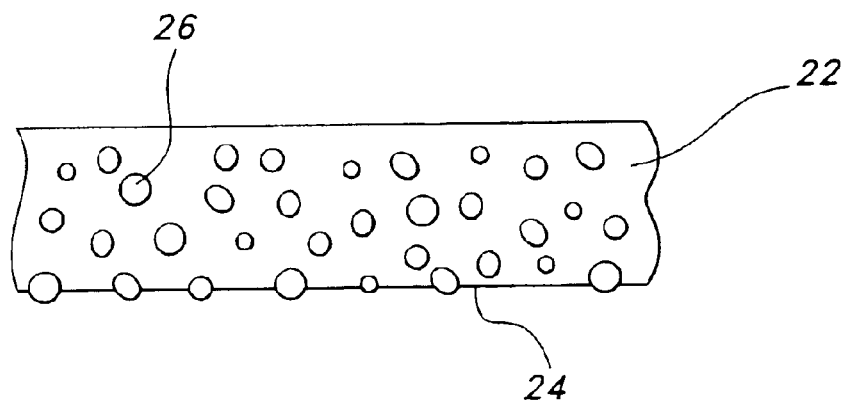
FIG. 2 is a schematic cross-sectional illustration of an article made according to the present invention, the article including a substrate body.
Figure 3:
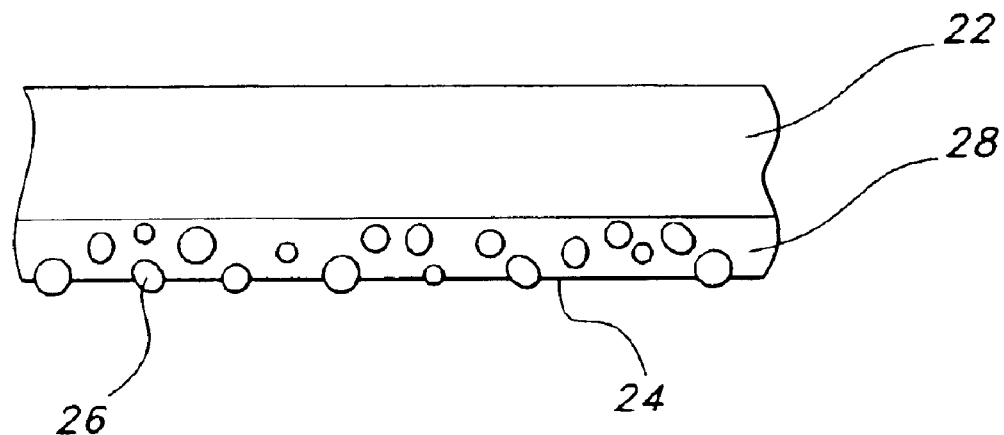
FIG. 3 is a schematic cross-sectional illustration of another article made according to the present invention, the article including a substrate body and a donning layer.
Figure 4:
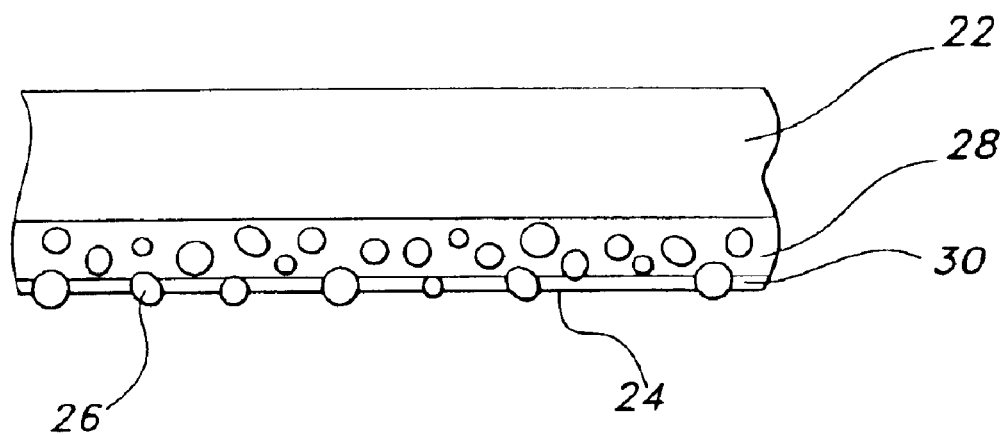
FIG. 4 is a schematic cross-sectional illustration of yet another article made according to the present invention, the article including a substrate body, a donning layer, and a lubricant layer.

The present invention generally relates to an elastomeric article having improved donning characteristics, for example a condom or glove 20 (FIG. 1), and a method of making such an article. The elastomeric article, for example, glove 20 (FIG. 1) includes a substrate body 22 (FIGS. 1, 2, 3, 4) with an inside surface 24 (FIGS. 1, 2, 3, 4). The inside surface 24 (FIGS. 1, 2, 3, 4) has a textured topography due to the presence of a plurality of partially exposed alkaline earth salt particles 26 (FIGS. 2, 3, 4) embedded within at least a portion of the inside surface 24 (FIGS. 1, 2, 3, 4). The particles 26 are embedded within the substrate body 22 but do not extend through the entire thickness of the article (FIGS. 2, 3, 4). Thus, the barrier properties of the article are maintained without compromise. Further, no separate binder material is needed to affix the particles 26 to the article. The particles 26 cause the overall coefficient of friction of the inside surface 24 to be reduced, thereby facilitating donning of the article. In the case of a glove 20 (FIG. 1), for example, the particles 26 may be present in an amount of from about 0.36 mass % to about 0.91 mass % of the glove 20.

The plurality of particles 26 may include any alkaline earth salt, including magnesium carbonate, calcium carbonate, magnesium stearate, calcium stearate, or the like, provided that the salt does not dissociate during the forming process. For instance, alkaline earth nitrates, chlorides, or sulfates may not be used, as they have a tendency to dissolve during formation of the article and cause a gelling of the elastomer.

In some embodiments, the elastomeric article includes a substrate body 22 formed from natural rubber, and a donning (i.e., interior) layer 28 (FIGS. 3, 4) bonded to the substrate body 22. Since the donning layer 28 contacts the skin directly when the glove 20 is donned, the material forming the donning layer 28 may be selected to facilitate donning. In some embodiments, the donning layer 28 may be formed from a composition including an elastomeric polymer and a plurality of alkaline earth salt particles 26 embedded within at least a portion of the inside surface 24 but not extending through the thickness of the article. Since the particles 26 are at least partially embedded within the donning layer 28, no separate binder material is needed to affix the particles 26 to the article.

The donning layer 28 may contain any elastomeric polymer that is capable of facilitating donning of the glove 20. Some examples of suitable materials for the donning layer 28 include, but are not limited to, polybutadienes, for example, 1,2-syndiotactic polybutadiene, polyurethanes, halogenated copolymers, and the like. For instance, in one embodiment, an unsaturated styrene-isoprene (SIS) having tri- or radial-blocks may be utilized. In one embodiment, the SIS block copolymer may have a polystyrene end block content of from about 10 mass % to about 20 mass % of the total weight of the SIS block copolymer. In another embodiment, the SIS block copolymer may have a polystyrene end block content of from about 15 mass % to about 18 mass % of the total weight of the SIS block copolymer. Moreover, the molecular weight of the polystyrene end blocks may typically be at least about 5,000 grams per mole. Some examples of suitable mid-block unsaturated SIS block copolymers include, but are not limited to, Kraton® D1107 available from Kraton Polymers and Vector® 511 and Vector® 4111 available from Dexco Polymers of Houston, Tex.

The plurality of alkaline earth salt particles 26 may include magnesium carbonate or other alkaline earth salts, such as magnesium stearate. However, alkaline earth nitrates and alkaline earth sulfates may not be used, as they tend to dissolve within the polymer latex and cause gelling. The composition may also include compounded natural rubber latex. Other additives may be present in the composition, for example, surfactants, colorants, antibacterial agents, antistatic agents, and the like.

A lubricant layer 30 (FIG. 4) may also overlie at least a portion of the donning layer 28 to aid in donning the article. The lubricant layer 30 may include, for example, a cationic surfactant (e.g., cetyl pyridinium chloride), an anionic surfactant (e.g., sodium lauryl sulfate), a nonionic surfactant, or the like. For instance, the lubricant layer 30 may contain a quaternary ammonium compound, such as that commercially available from Goldschmidt Chemical Corporation of Dublin, Ohio under the trade name Verisoft BTMS, and a silicone emulsion such as that commercially available from General Electric Silicones of Waterford, N.Y. ("GE Silicones") under the trade name AF-60. Verisoft BTMS contains behnyl trimethyl sulfate and cetyl alcohol, while AF-60 contains polydimethylsiloxane, acetylaldehyde, and small percentages of emulsifiers.

In another embodiment, the lubricant layer 30 may include a silicone emulsion. One such silicone emulsion that may be used is DC 365, a pre-emulsified silicone (35% TSC) that is commercially available from Dow Corning Corporation (Midland, Mich.). DC 365 is believed to contain 40–70 mass % water (aqueous solvent), 30–60 mass % methyl-modified polydimethylsiloxane (silicone), 1–5 mass % propylene glycol (non-aqueous solvent), 1–5 mass % polyethylene glycol sorbitan monolaurate (nonionic surfactant), and 1–5 mass % octylphenoxy polyethoxy ethanol (nonionic surfactant). Another silicone emulsion that may be used with the present invention is SM 2140, commercially available from GE Silicones. SM 2140 is a pre-emulsified silicone (50% TSC) that is believed to contain 30–60 mass % water (aqueous solvent), 30–60 mass % amino-modified dimethylpolysiloxane (silicone), 1–5% ethoxylated nonyl phenol (nonionic surfactant), 1–5 mass % trimethyl-4-nonyloxypolyethyleneoxy ethanol (nonionic surfactant), and minor percentages of acetaldehyde, formaldehyde, and 1,4 dioxane. If desired, these pre-emulsified silicones may be diluted with water or other solvents prior to use.

An elastomeric article of the present invention may be formed using a variety of processes, for example, dipping, spraying, halogenating, drying, and curing. An exemplary dipping process for forming a glove 20 is described herein, though other processes may be employed to form various articles having different shapes and characteristics. Although a batch process is described and shown herein, it should be understood that semi-batch and continuous processes may also be utilized with the present invention.

A glove 20 (FIG. 1) is formed on a hand-shaped mold, termed a "former". The former may be made from any suitable material, such as glass, metal, porcelain, or the like. The surface of the former defines at least a portion of the surface of the glove 20 to be manufactured.

The former is conveyed through a preheated oven to evaporate any water present. The former is then dipped into a bath typically containing a coagulant, a powder source, a surfactant, and water. The residual heat evaporates the water in the coagulant mixture leaving, for example, calcium nitrate, calcium carbonate powder, and surfactant on the surface of the former. The coagulant may contain calcium ions (e.g., calcium nitrate) that enable a polymer latex to deposit onto the former. The powder may be calcium carbonate powder, which aids release of the completed glove 20 from the former. The surfactant provides enhanced wetting to avoid forming a meniscus and trapping air between the form and deposited latex, particularly in the cuff area. However, any suitable coagulant composition may be used, including those described in U.S. Pat. No. 4,310,928 to Joung, incorporated herein in its entirety by reference.

The coated former is then dipped into a polymer latex bath. The polymer present in the bath includes an elastomer that forms the substrate body 22 (FIGS. 1, 2, 3, 4). In some embodiments, the elastomer includes natural rubber, which may be supplied as a compounded natural rubber latex. Thus, the bath may contain, for example, compounded natural rubber latex, stabilizers, antioxidants, curing activators, organic accelerators, vulcanizers, and the like. The stabilizers may include phosphate-type surfactants. The antioxidants may be phenolic, for example, 2,2'-methylenebis (4-methyl-6-t-butylphenol). The curing activator may be zinc oxide. The organic accelerator may be dithiocarbamate. The vulcanizer may be sulfur or a sulfur-containing compound. To avoid crumb formation, the stabilizer, antioxidant, activator, accelerator, and vulcanizer may first be dispersed into water by using a ball mill and then combined with the natural rubber latex.

During the dipping process, the coagulant on the former causes some of the elastomer to become locally unstable and coagulate onto the surface of the former. The elastomer coalesces, capturing the particles present in the coagulant composition at the surface of the coagulating elastomer. The former is withdrawn from the bath of elastomer and the coagulated layer is permitted to fully coalesce, thereby forming a substrate body 22. The former is dipped into one or more latex baths a sufficient number of times to attain the desired glove 20 thickness. In some embodiments, the substrate body 22 may have a thickness of from about 0.004 inches to about 0.012 inches.

The former is then dipped into a leaching tank in which hot water is circulated to remove the water-soluble components, such as residual calcium nitrates and proteins contained in the natural rubber latex. This leaching process may generally continue for about twelve minutes at a water temperature of about 120° F. The glove 20 is then dried on the former to solidify and stabilize the substrate body 22. It should be understood that various conditions, process, and materials used to form the substrate body 22.

Other layers may be formed by including additional dipping processes. Such layers may be used to impart additional attributes to the glove 20. When these processes are complete, the former then undergoes an additional coating process to form the interior, or donning layer 28, of the glove 20. It should be understood that any process may be used to form the donning layer 28, such as dipping, spraying, immersion, printing, tumbling or any other suitable technique.

Where a dipping process is used, the former is dipped into a composition that contains an elastomeric polymer and a plurality of alkaline earth salt particles 26. Any elastomeric polymer may be selected for use in the donning layer 28 composition. However, since this layer ultimately forms the surface that contacts the skin, it may be advantageous to select a polymer that facilitates donning of the article. Various suitable polymers are described above. In one embodiment, the elastomeric polymer that may be used is 1,2-polybutadiene. More particularly, the polymer may be 1,2-syndiotactic polybutadiene, such as that available as an emulsion from Ortec, Inc., P.O. Box 1469, Easley, S.C. 29641, under the trade name PRESTO. The PRESTO emulsion contains about 15% total solids content (TSC). Where the polymer emulsion is provided with a greater or lesser TSC, the relative amount of each component may be adjusted to provide a similar donning layer composition.

The composition further includes a plurality of alkaline earth salt particles 26, such as magnesium carbonate and others described above. As previously stated, nitrates, chlorides, and sulfates of alkaline earth salts are to be avoided, as they cause undesirable gelling of the polymer. The alkaline earth salt particles 26 may range in particle size, and in some embodiments, are about 325 mesh. Such particles 26 may be obtained from any commercial source, for example, China National Chemical Construction Jiangsu Company, P.O. Box 305, Listerhills Road, Bradford, West Yorkshire BD7 1HY, England.

The composition may also include natural rubber to enhance the softness of the donning layer 28. In some instances, the natural rubber may be provided as a compounded latex having about 40 mass % total solids. Where the compounded latex is provided with a greater or lesser TSC, the relative amount of each component may be adjusted to provide a similar donning layer composition.

Thus, in some embodiments, the composition used to form the donning layer 28 may include from about 0.1 mass % to about 10 mass % 1,2-syndiotactic polybutadiene, about 0.1 mass % to about 5 mass % magnesium carbonate, about 0.1 mass % to about 10 mass % natural rubber, and deionized water.

In other embodiments, the composition may include from about 2 mass % to about 5 mass % 1,2-syndiotactic polybutadiene, about 0.5 mass % to about 3 mass % magnesium carbonate, about 1 mass % to about 3 mass % natural rubber, and deionized water. In such an embodiment, the resulting donning layer 28 may include from about 45 mass % to about 57 mass % 1,2-syndiotactic polybutadiene, about 14 mass % to about 27 mass % magnesium carbonate, and about 27 mass % to about 29 mass % natural rubber. Given that a typical glove 20 may have a mass of from about 10 grams to about 15 grams, and that the donning layer 28 may have a mass of from about 0.25 grams to about 0.50 grams, the resulting glove 20 may include from about 1.1 mass % to about 1.9 mass % 1,2-polybutadiene and 0.36 mass % to about 0.91 mass % magnesium carbonate. The glove 20 may also include about 0.68 mass % to about 0.95 mass % natural rubber in the donning layer 28, plus the natural rubber present in the substrate body 22.

In yet another embodiment, the composition may include about 5 mass % 1,2-syndiotactic polybutadiene, about 2 mass % magnesium carbonate, about 3 mass % natural rubber, and deionized water. Using this composition, the resulting donning layer 28 includes about 50 mass % 1,2-syndiotactic polybutadiene, about 20 mass % magnesium carbonate, and about 30 mass % natural rubber. Similar calculations to those above may be performed to determine the overall composition of the glove 20.

When the former is withdrawn from the composition, the substrate body 22 coated with the donning layer composition is then sent to a curing station where the natural rubber is vulcanized, typically in an oven. The curing station initially evaporates any remaining water in the coating on the former and then proceeds to a higher temperature vulcanization. The drying may occur at a temperature of from about 85° C. to about 95° C., with a vulcanization step occurring at a temperature of from about 110° C. to about 120° C. For example, the glove 20 may be vulcanized in a single oven at a temperature of 115° C. for about 20 minutes. Alternatively, the oven may be divided into four different zones with a former being conveyed through zones of increasing temperature. For instance, the oven may have four zones with the first two zones being dedicated to drying and the second two zones being primarily for vulcanizing. Each of the zones may have a slightly higher temperature, for example, the first zone at about 80° C., the second zone at about 95° C., a third zone at about 105° C., and a final zone at about 115° C. The residence time of the former within each zone may be about ten minutes. The accelerator and vulcanizer contained in the latex coating of the former are used to crosslink the natural rubber. The vulcanizer forms sulfur bridges between different rubber segments and the accelerator is used to promote rapid sulfur bridge formation.

Upon being cured, the former may be transferred to a stripping station where the glove is removed from the former. The stripping station may involve automatic or manual removal of the glove 20 from the former. For example, in one embodiment, the glove 20 is manually removed and turned inside out as it is stripped from the former. By inverting the glove 20 in this manner, the textured donning layer 28 formed on the outside of the substrate body 22 becomes the inside of the glove 20.

The solidified glove 20 is then subjected to various post-formation processes. Since the alkaline earth salt particles 26 present in the glove 20 are physically embedded within the donning layer 28, such processes have little or no effect on either the quantity of particles 26 retained or their ability to aid donning.

Optionally, after being removed from the formers, the glove 20 may be rinsed in water and dried. The glove 20 is then turned inside out to expose and halogenate the outside (i.e., donning side) of the glove 20. The halogenation (e.g., chlorination) may be performed in any suitable manner known to those skilled in the art. Such methods include: (1) direct injection of chlorine gas into a water mixture, (2) mixing high density bleaching powder and aluminum chloride in water, (3) brine electrolysis to produce chlorinated water, and (4) acidified bleach. Examples of such methods are described in U.S. Pat. No. 3,411,982 to Kavalir; U.S. Pat. No. 3,740,262 to Agostinelli; U.S. Pat. No. 3,992,221 to Homsy, et al.; U.S. Pat. No. 4,597,108 to Momose; and U.S. Pat. No. 4,851,266 to Momose, U.S. Pat. No. 5,792,531 to Littleton, et al., which are incorporated herein in their entirety by reference. In one embodiment, for example, chlorine gas is injected into a water stream and then fed into a chlorinator (a closed vessel) containing the glove 20. The concentration of chlorine can be altered to control the degree of chlorination. The chlorine concentration is typically at least about 100 parts per million (ppm), in some embodiments from about 200 ppm to about 3500 ppm, and in some embodiments, from about 300 ppm to about 600 ppm, for example, about 400 ppm. The duration of the chlorination step may also be controlled to vary the degree of chlorination and may range, for example, from about 1 to about 10 minutes, for example, 4 minutes.

Still within the chlorinator, the chlorinated glove 20 may then be rinsed with tap water at about room temperature. This rinse cycle may be repeated as necessary. Once all water is removed, the glove 20 is tumbled to drain the excess water.

A lubricant composition may then be added into the chlorinator, followed by a tumbling process that lasts for about five minutes. The lubricant forms a layer on at least a portion of the donning layer 28 to further enhance donning of the glove 20. In one embodiment, this lubricant layer 30 may contain a silicone or silicone-based component. As used herein, the term "silicone" generally refers to a broad family of synthetic polymers that have a repeating silicon-oxygen backbone, including, but not limited to, polydimethylsiloxane and polysiloxanes having hydrogen-bonding functional groups selected from the group consisting of amino, carboxyl, hydroxyl, ether, polyether, aldehyde, ketone, amide, ester, and thiol groups. In some embodiments, polydimethylsiloxane and/or modified polysiloxanes may be used as the silicone component in accordance with the present invention. For instance, some suitable modified polysiloxanes that can be used in the present invention include, but are not limited to, phenyl-modified polysiloxanes, vinyl-modified polysiloxanes, methyl-modified polysiloxanes, fluoro-modified polysiloxanes, alkyl-modified polysiloxanes, alkoxy-modified polysiloxanes, amino-modified polysiloxanes, and combinations thereof. Examples of commercially available silicones that may be used with the present invention include DC 365 available from Dow Corning or SM 2140 available from GE Silicones, described in detail above. However, it should be understood that any silicone that provides a lubricating effect may be used to enhance the donning characteristics of the glove 20. The lubricant solution is then drained from the chlorinator and may be reused if desired. It should be understood that the lubricant composition may be applied at a later stage in the forming process, and may be applied using any technique, such as dipping, spraying, immersion, printing, tumbling, or the like.

The coated glove 20 is then put into a drier and dried from about 10 to 60 minutes (e.g., 40 minutes) at from about 20° C. to about 80° C. (e.g., 40° C.) to dry the donning layer 28. The glove 20 is are then inverted and the grip surface is dried from about 20 to 100 minutes (e.g., 60 minutes) at from about 20° C. to about 80° C. (e.g., 40° C.).

It has been discovered that the resulting glove 20 provides enhanced donning characteristics. The presence of exposed, yet embedded, alkaline earth salt particles 26 within the article decreases the overall coefficient of friction of the surface and permits the glove 20 to be donned more readily. Further, since the particles 26 are physically embedded within the article, no additional binder is needed. This provides a processing advantage over other particulate compositions that require use of a binder to ensure that particles 26 will not inadvertently dissociate from the glove 20. Additionally, where a lubricant layer 30 is utilized in accordance with the present invention, donning is further enhanced, These discoveries are evidenced by the following examples, which are not intended to be limiting in any manner.

EXAMPLE 1

The ability to form an elastomeric glove having improved donning characteristics in accordance with the present invention was demonstrated. A pre-heated, porcelain, glove-shaped former was first dipped into a coagulant solution that contained calcium nitrate, calcium carbonate, a surfactant, and water. The coated former was then dipped into a dip tank containing compounded, pre-vulcanized natural rubber latex. After dipping, the former was removed from the natural rubber latex dip tank, leached with water, and dried.

The former was then dipped in a various compositions, some containing an emulsion of 1,2-syndiotactic polybutadiene, a plurality of alkaline earth salt particles, and natural rubber in amounts specified below. The 1,2-syndiotactic polybutadiene was provided as an emulsion having 15% total solids content (TSC) under trade name PRESTO (described in detail above). The natural rubber was provided as a compounded natural rubber latex having 40% TSC. A sample calculation based on 100 grams of the donning layer composition is provided in Table 1.

TABLE 1

Sample calculation of a desired composition.

| To obtain a composition having: | Combine: |
|---|---|
| 5 mass % 1,2-Polybutadiene | 33 grams PRESTO emulsion (15% TSC) |
| 2 mass % Magnesium carbonate | 2 grams Magnesium carbonate |
| 3 mass % Natural rubber | 7.5 grams Natural rubber latex (40% TSC) |
| Remainder deionized water | Remainder deionized water |
| Total: 100% | Total: 100 grams |

The substrate body on the former was cured in an oven at a temperature of 115° C. for about 20 minutes. The glove was then manually removed and turned inside out as it was stripped from the former. The glove was then rinsed in deionized water. The thickness of the resulting glove was 0.25 millimeters.

To enhance the gripping properties of the outer surface, or grip side, of the glove, 1.5 grams of DC 365 (35% TSC) was added per 98.5 grams of water to achieve a homogeneous solution having a TSC of 0.5%. The glove was then immersed in a tumbler for 5 minutes that was injected with the diluted DC 365 emulsion. After the silicone emulsion was applied, the glove was dried for 45 minutes at 180° F.

The glove was then turned inside out and placed into a chlorinator. Chlorine gas mixed with a water stream was injected into the chlorinator to chlorinate the donning surface of the glove. The chlorine concentration was 400 ppm and the pH was 1.74. The glove was immersed in the chlorine solution for 2 minutes. In this particular example, cetyl pyridinium chloride was also added to the chlorine solution at a concentration of 0.25% by weight of the solution. After chlorinating, the glove was inverted and dried at a temperature of 180° F. for 45 minutes.

The gloves were then evaluated and rated using a donning scale well known in the field of glove manufacture. Specifically, the glove was donned on a wet hand. After donning the glove, the wearer was asked to rate the damp donnability of the wearer-contacting surface on a scale from 1 to 5, with 5 representing maximum damp donnability. The ratings and explanations thereof are provided in Table 2.

TABLE 2

Rating scale used for evaluation of glove donning characteristics.

| Rating | Description | Detail |
|---|---|---|
| 5 | Excellent | Easy to don with no adjustment |
| 4 | Good | Glove donned with minimal adjustment |
| 3 | Fair | Can don with reasonable fit and some adjustment |
| 2 | Poor | Can don the glove only partially |
| 1 | Fail | Can not don |
| 0 | Not scored | Can not even attempt to don |

The results of the evaluation are summarized in Table 3. The rating is an average of about 15 to 30 gloves evaluated.

TABLE 3

Summary of results of glove evaluation.

| Sample | 1,2-Syndiotactic polybutadiene (mass %) | CaCO3 (mass %) | MgCO3 (mass %) | Natural rubber (mass %) | Rating |
|---|---|---|---|---|---|
| 1 | 0 | 0 | 0 | 2.5 | 0 |
| 2 | 0 | 2 | 0 | 0 | 1 |
| 3 | 2.5 | 3 | 0 | 0 | 2 |
| 4 | 5 | 5 | 0 | 0 | 1 |
| 5 | 0.75 | 2 | 0 | 0 | 2 |
| 6 | 5 | 2 | 0 | 0 | 0 |
| 7 | 5 | 0 | 0 | 3 | 2 |
| 8 | 5 | 0 | 2 | 3 | 4 |

Sample 1 represents a control having a donning layer formed only from natural rubber. The donning of the glove could not even be attempted. The glove that was most readily donned, Sample 8, included 5 mass % 1,2-syndiotactic polybutadiene, 2 mass % magnesium carbonate, and 3 mass % natural rubber. Other combinations (Samples 2, 3, 4, 5, and 7) showed improved donning over the control (Sample 1), but did not perform as well as the combination of the 1,2-syndiotactic polybutadiene, alkaline earth salt particles, and compounded natural rubber latex in the amounts utilized to prepare Sample 8.

EXAMPLE 2

A pre-heated, glove-shaped former was first dipped into a coagulant solution that contained calcium nitrate, calcium carbonate, a surfactant, and water. The coated former was then dipped into a dip tank containing compounded, pre-vulcanized natural rubber latex. After dipping, the former was removed from the natural rubber latex dip tank and leached with water. The latex-coated former was then dipped into a solution containing 5.0 mass % of a 1,2-syndiotactic polybutadiene emulsion (15% TSC), 3.0 mass % compounded natural rubber, 2.0 mass % magnesium carbonate, and 90.0 mass % water to form the donning layer of the glove. Thereafter, the latex-coated former was cured in an oven at a temperature of 115° C. for about 20 minutes. The glove was manually removed and turned inside out as it was stripped from the former. After being removed from the former, the glove was rinsed in deionized water. The thickness of the resulting glove was 0.25 millimeters.

To enhance the gripping properties of the outer surface, 0.86–1.14 grams of DC 365 (35% TSC) was added per 98.86–99.14 grams of water to achieve a homogeneous solution having a TSC of 0.3–0.4%. The glove was then immersed in a tumbler for 4 minutes that was injected with the diluted DC 365 emulsion. Once coated with the silicone emulsion, the glove was then dried for 40 minutes at 40° C.

The glove was then turned inside out and placed into a chlorinator. Chlorine gas mixed with a water stream was injected into the chlorinator to chlorinate the donning surface of the glove. The chlorine concentration was 400 ppm and the pH was 1.74. The glove was immersed in the chlorine solution for 6 minutes. After chlorinating, the glove was rinsed (soft water and deionized water).

SM 2140 (GE Silicones) was then applied to the donning surface of the glove using a tumbling process. Specifically, 1.2–1.6 grams of SM 2140 (50% TSC) was added per 98.4–98.8 grams of water to achieve a homogeneous solution having a TSC of 0.8–0.9%. The glove was then immersed in a tumbler for 4 minutes that was injected with the diluted SM 2140 emulsion. The glove was then dried at 55° C. for 40 minutes, inverted, and dried again at 55° C. for 60 minutes.

The glove sample described above was then tested as set forth in Example 1 to determine the donning characteristics of the glove. It was determined that the damp donning rating was 5. Thus, the presence of the SM 2140 silicone emulsion provided a lubricating effect and further enhanced donning of the glove.

The invention may be embodied in other specific forms without departing from the scope and spirit of the inventive characteristics thereof. The present embodiments therefore are to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method of making a textured article, the method comprises:

providing a substrate body;

applying to the substrate body a donning layer composition comprising an elastomeric polymer with a plurality of alkaline earth salt particles at least partially embedded in said polymer, wherein said salt particles serve as a drying agent and is adapted to remove tackiness of said elastomeric polymer before curing, and a number of said salt particles being exposed and protruding from a contacting surface to form a textured surface topography adapted for donning characteristics.

2. The method according to claim 1, wherein said alkaline earth salt particles do not dissociate in an emulsion of said elastomeric polymer during a forming process of said article.

3. The method according to claim 1, wherein said elastomeric polymer includes a material selected from polybutadiene, polyurethane, or halogenated copolymer.

4. The method according to claim 3, wherein said elastomeric polymer is a 1,2-syndiotactic polybutadiene.

5. The method of claim 1, wherein the plurality of salt particles includes magnesium carbonate or magnesium stearate.

6. The method according to claim 1, further comprising applying a lubricant composition to the substrate body.

7. The method according to claim 6, wherein said lubricant composition overlies at least a portion of said donning layer.

8. The method according to claim 6, wherein said lubricant composition includes at least one of the following: a silicone emulsion, a cationic surfactant, an anionic surfactant, or an nonionic surfactant.

9. The method of claim 1, the donning layer composition further comprises a natural rubber latex.

10. The method according to claim 1, wherein said substrate body is formed on a mold.

11. The method according to claim 1, wherein said donning layer composition is applied to said substrate body according either a spraying or dipping process.

12. A method of making an article having improved donning characteristics, the method comprising: providing a substrate body formed on a mold; applying to the substrate body a donning layer composition comprising an elastomeric polymer having a plurality of exposed alkaline earth salt particles that are at least partially embedded in and protruding from said elastomeric polymer to form a textured surface topography, wherein said salt particles serve as a drying agent and is adapted to remove tackiness of said elastomeric polymer before curing; and, curing the substrate body and donning layer to form an article; and removing the article from said mold.

13. The method according to claim 12, wherein said elastomeric polymer includes 1,2,-syndiotactic polybutadiene.

14. The method of claim 13, wherein said 1,2-syndiotactic polybutadiene is provided as an emulsion having a total solids content of about 15%.

15. The method according to claim 12, wherein said alkaline earth salt particles do not dissociate in an emulsion of said elastomeric polymer during said forming process of said donning layer.

16. The method according to claim 12, wherein said plurality of salt particles includes magnesium carbonate or magnesium stearate.

17. The method of claim 12, wherein said plurality of salt particles has a size of about 325 mesh.

18. The method according to claim 12, wherein the donning layer composition further comprises a natural rubber latex.

19. The method of claim 17, wherein said natural rubber is provided as a compounded latex having a solids content of about 40%.

20. The method according to claim 12, wherein the donning layer composition comprises from about 0.1 mass % to about 10 mass % 1,2-syndiotactic polybutadiene, about 0.1 mass % to about 5 mass % alkaline earth salt particles, about 0.1 mass % to about 10 mass % natural rubber, and deionized water.

21. The method according to claim 12, wherein said donning layer composition is applied using either a dipping or spraying process.

22. The method according to claim 12, wherein said curing includes heating treating.

23. The method according to claim 12, further comprising applying a lubricant composition to said article.

24. A method of making a glove having improved donning characteristics comprising:
providing a substrate body of a first material comprising natural rubber formed on a hand-shaped former;
dipping the substrate body into a donning layer composition of a second material, comprising 1,2-syndiotactic polybutadiene, a plurality of exposed alkaline earth salt particles at least partially protruding from and embedded in said 1,2-syndiotactic polybutadiene, and natural rubber, wherein said salt particles serve as a drying agent and is adapted to remove tackiness of said donning layer before curing;
curing the substrate body and donning layer to from a glove;
removing the glove from the former; and
inverting the glove.

25. The method of claim 24, wherein the plurality of salt particles includes calcium carbonate, magnesium carbonate, or magnesium stearate.

26. The method of claim 24, wherein said plurality of salt particles do not dissociate in an emulsion of said 1,2-syndiotactic polybutadiene during said forming process of said donning layer.

27. The method according to claim 24, further comprising applying a lubricant composition to the donning layer.

28. The method according to claim 27, wherein the lubricant composition includes a silicone.

29. The method of claim 24, wherein the donning layer composition comprises from about 0.1 mass % to about 10 mass % 1,2-syndiotactic polybutadiene, about 0.1 mass % to about 5 mass % alkaline earth salt particles, about 0.1 mass % to about 10 mass % natural rubber, and deionized water.

30. The method according to claim 29, wherein said donning layer composition comprises about 1.1 mass % to about 5 mass % 1,2-polybutadiene, about 0.36 mass % to about 3 mass % magnesium carbonate, and about 1 mass % to about 3 mass % natural rubber.

31. The method according to claim 29, wherein the donning layer composition comprises from about 2 mass % to about 5 mass % 1,2-syndiotactic polybutadiene, about 0.5% to about 3 mass % alkaline earth salt particles, about 1 mass % to about 3 mass % natural rubber, and about 89 mass % to about 96.5 mass % water.

32. A method of making a textured article, the method comprises:
providing a substrate body that includes a natural rubber latex polymer;
applying to said substrate body a donning layer composition comprising a second polymer, different from said substrate body, and a plurality of alkaline earth salt particles exposed on an inner surface of said substrate body, and incorporated at least partially in and protruded from said second polymer matrix structure, wherein said salt particles serve as a drying agent and is adapted to remove tackiness of said second polymer before curing.

* * * * *